US008997948B2

(12) United States Patent
Li et al.

(10) Patent No.: US 8,997,948 B2
(45) Date of Patent: Apr. 7, 2015

(54) HAND-DETECTING BRAKE SYSTEM FOR BABY STROLLER

(71) Applicant: Lerado (Zhong Shan) Industrial Co., Ltd., Guang Dong Province (CN)

(72) Inventors: Wei-Yeh Li, Tainan (TW); Nien-Li Peng, Chiayi County (TW); Tsung-Li Wu, Chiayi (TW)

(73) Assignee: Lerado (Zhong Shan) Industrial Co., Ltd, Zhong Shan, Guang Dong Province (CN)

( * ) Notice: Subject to any disclaimer, the term of this patent is extended or adjusted under 35 U.S.C. 154(b) by 101 days.

(21) Appl. No.: 13/768,527

(22) Filed: Feb. 15, 2013

(65) Prior Publication Data

US 2013/0213749 A1   Aug. 22, 2013

(30) Foreign Application Priority Data

Feb. 16, 2012 (CN) .......................... 2012 1 0035062
Feb. 8, 2013 (CN) .......................... 2013 1 0050194

(51) Int. Cl.
*F16D 65/28* (2006.01)
*B62B 9/08* (2006.01)
*B62B 5/04* (2006.01)
*B62B 9/20* (2006.01)

(52) U.S. Cl.
CPC ............... *B62B 9/08* (2013.01); *B62B 5/0404* (2013.01); *B62B 9/082* (2013.01); *B62B 9/085* (2013.01); *B62B 9/20* (2013.01)

(58) Field of Classification Search
USPC ............... 188/19, 20, 31, 156, 157, 158, 161, 188/162, 171, 71.7, 72.8
See application file for complete search history.

(56) References Cited

U.S. PATENT DOCUMENTS

| 5,460,399 | A |   | 10/1995 | Baechler et al. |
| 5,796,192 | A | * | 8/1998 | Riepl ............................ 188/171 |
| 6,125,975 | A | * | 10/2000 | Seeto et al. .................... 188/171 |
| 7,175,004 | B2 | * | 2/2007 | Kassai et al. ..................... 188/31 |
| 7,708,120 | B2 | * | 5/2010 | Einbinder ........................ 188/31 |
| 7,787,646 | B2 | * | 8/2010 | Pelrine et al. ................. 381/191 |
| 2007/0051566 | A1 | * | 3/2007 | Marlow ........................... 188/20 |
| 2008/0211206 | A1 | * | 9/2008 | Thorne et al. ................. 280/650 |

FOREIGN PATENT DOCUMENTS

CN    202193108         4/2012
DE    29818659 U1      4/1999

* cited by examiner

*Primary Examiner* — Thomas J Williams
(74) *Attorney, Agent, or Firm* — Muncy, Geissler, Olds & Lowe, P.C.

(57) ABSTRACT

A hand-detecting brake system for baby stroller is equipped on a stroller frame, including a handle holder, a brake mechanism, an electric motor, and a battery. The handle holder is connected to one end of the stroller frame equipped with a hand-detecting device for creating a signal when user's hand being held or touched on the handle holder. The brake mechanism is operatively mounted on one side of a first wheel of the stroller frame for braking and un-braking the first wheel. The electric motor is capable of driving the brake mechanism to brake the first wheel when being received the signal from the hand-detecting device, and un-brake the first wheel when the signal from the hand-detecting device being disappeared. The battery electrically connected to the hand-detecting device and the electric motor for supplying needed power thereto.

7 Claims, 11 Drawing Sheets

HAND-DETECTING BRAKE SYSTEM FOR BABY STROLLER

BACKGROUND OF THE INVENTION

1. Field of the Invention

The present invention relates a brake system for mounting on a stroller, especially to a brake system actuated by either holding or touching a handle holder or stepping downward a driving pedal near a wheel for braking and un-braking the stroller.

2. Description of the Related Art

There are a lot of mechanisms and methods being using commercially for braking a baby stroller. The basic type of mechanism is furnished with a pedal having a toothed portion operatively connected to a rear wheel. The rear wheel also has an engageable toothed portion for detachably engaging with the toothed portion of the pedal, in order to brake the stroller.

As the pedals are separately installed on both sides of a stroller, the brake mechanisms cannot be operated simultaneously. The baby stroller may therefore lose its balance and cause the baby to fall out of the stroller when brake are applied suddenly at a high speed.

For fast movement of a baby stroller or a jogger on a steep or rugged road, it is preferable to brake the rear wheels of the stroller or the jogger simultaneously, to increase safety and avoid unwanted accidents while braking. A requirement that the rear wheels on both the right and left sides of the stroller or the jogger be braked simultaneously, is now part of the British safety standard for stroller products.

As an example, German Patent DE29818659U1 discloses a baby stroller with a brake device that is capable of braking or releasing the left and right side rear wheels simultaneously.

The brake device of the German patent is controlled by a control plate. The control plate is used to drive a tubular braking element which can be moved along its axial direction. The control plate therefore brakes or releases the wheels of a stroller. Accordingly, the user can step down on the control plate with their shoes in order to brake the stroller, and hook up the plate using their shoe tip in order to release the braked state.

As being disclosed in CN Publication 201120216569.3 and U.S. Pat. No. 5,460,399, a stroller brake devices may be equipped with a pedal, by lifting the pedal upward or stepping downward can operate a pair of braking rods for brake and un-brake the stroller. The bottom of the pedal has a pair of slanted surfaces for keeping itself in an inclined position. During braking the stroller, the user can step down on the pedal to push the braking rods axially along the slanted surface; however when the user wants to un-brake the stroller, should try to hook up the pedal upward by their shoe tip, and this may hurt or smudge the foot skin or the user's shoes surface.

SUMMARY OF THE INVENTION

In order to avoid the possible damage to shoes surface during user braking the stroller by foot, the present invention provides a hand-detecting brake system for baby stroller, that is controllable simply by either holding on a handle holder of the stroller or just stepping downward a driving pedal equipped on one side of the rear wheel.

The hand-detecting brake system for baby stroller according to the present invention is equipped on a stroller frame, including a handle holder, a brake mechanism, an electric motor, and a battery.

The handle holder is connected to one end of the stroller frame equipped with a hand-detecting device for creating a signal when user's hand being held or touched on the handle holder.

The brake mechanism is operatively mounted on one side of a first wheel of the stroller frame for braking and un-braking the first wheel.

The electric motor is capable of driving the brake mechanism to brake the first wheel when being received the signal from the hand-detecting device, and un-brake the first wheel when the signal from the hand-detecting device being disappeared.

The battery electrically connected to the hand-detecting device and the electric motor for supplying needed power thereto.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention; examples of which are illustrated in the accompanying drawings.

Figure 1:
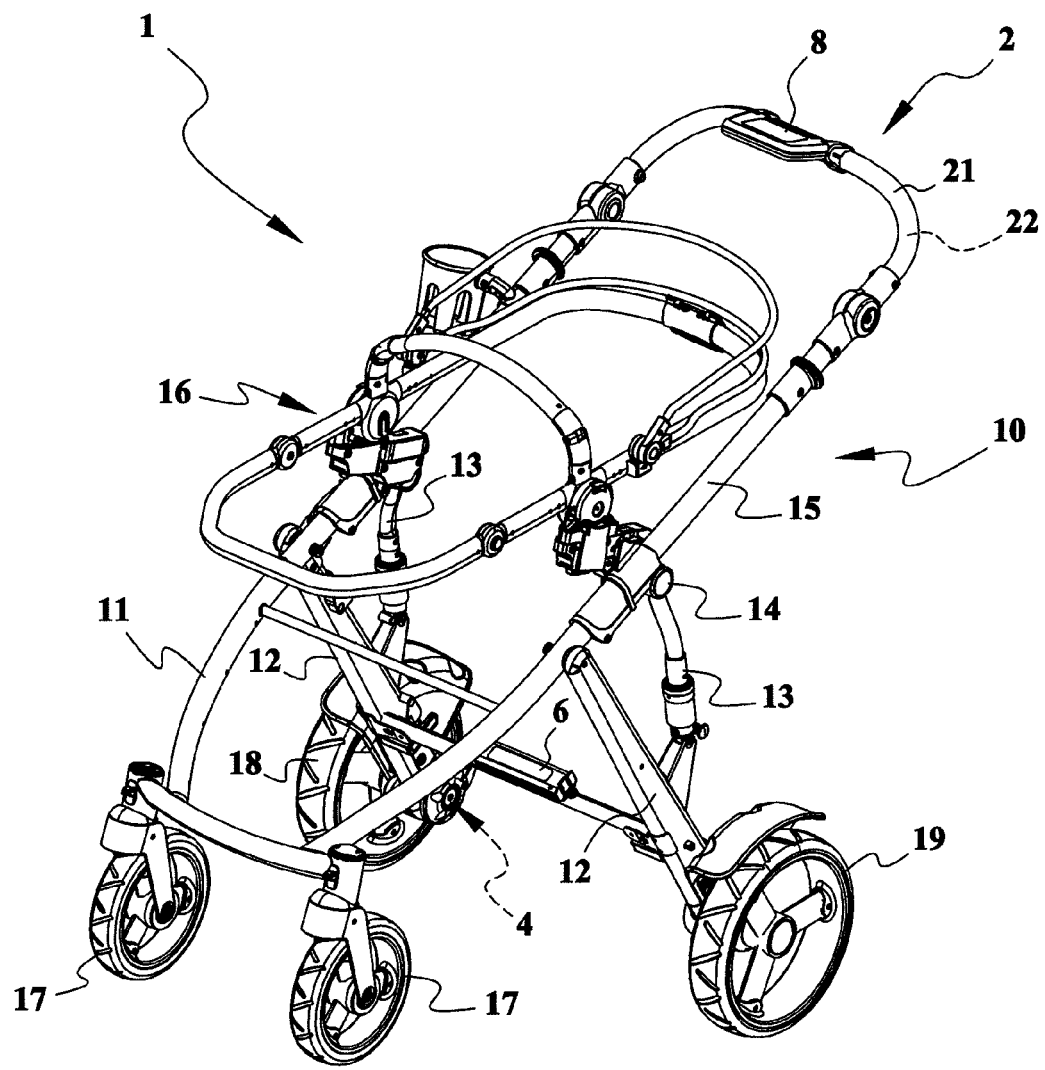
FIG. 1 is a front-left perspective view showing a hand-detecting brake system installed on baby stroller according to the present invention.
Figure 2:
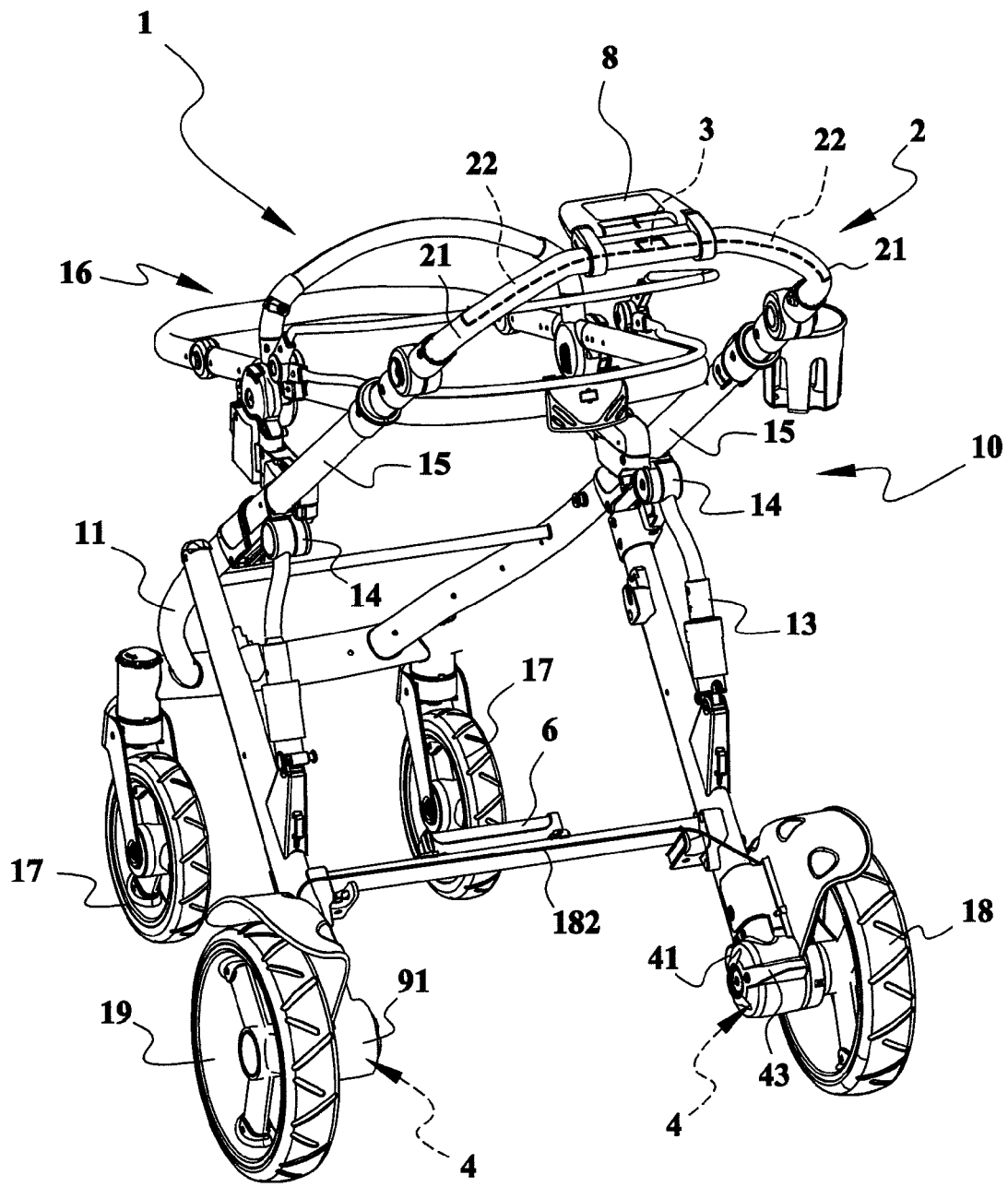
FIG. 2 is a rear-left perspective view showing a hand-detecting brake system installed on baby stroller according to the present invention.
Figure 3:
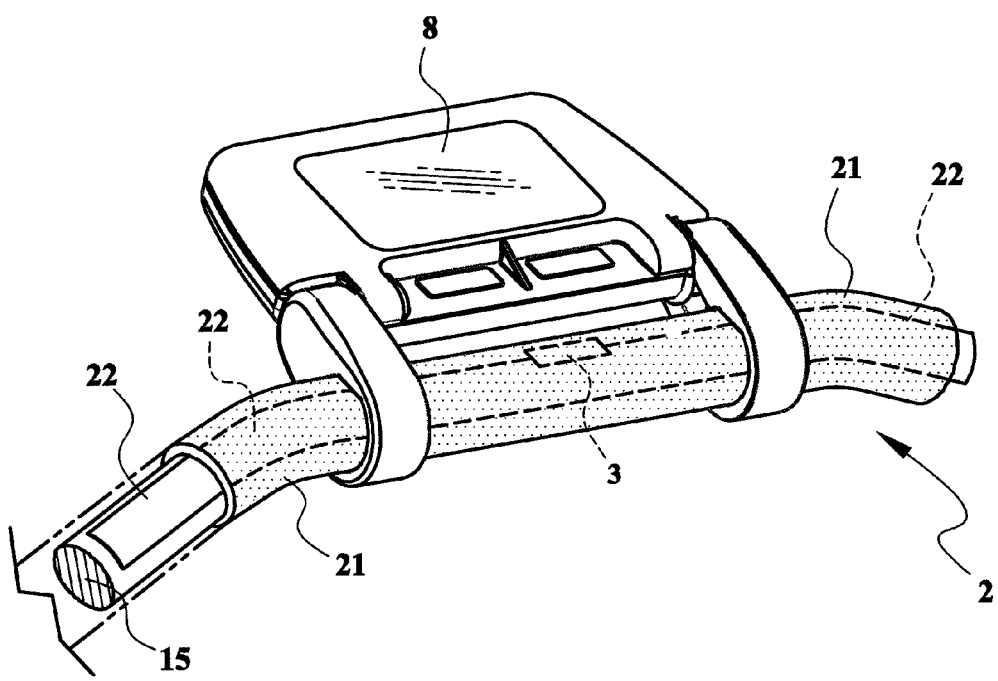
FIG. 3 is a schematic perspective view showing a hand holder equipped with a control panel and a hand detecting device covered with non-metal material.

Referring to FIGS. 1-3, a prefer embodiment of the hand-detecting brake system for baby stroller according to the present invention is mounted on a stroller frame 1, which includes a handle holder 2, a brake mechanism 4, an electric motor 5, and a battery 6.

The stroller frame 1 may include at least a pair of front tube 11 for connecting a front wheel 17, a pair of rear tubes 12, a pair of rear connecting rods 13, and a push arm 15 pivotally by two lockable joints 14, and capable of erecting in a use configuration 10 and a folded configuration (not shown). Selectively, the stroller frame 1 may equipped with a pair of sockets for detachably connecting a seat support rack 16 or baby carrier thereby transporting a baby from vehicle seat to the stroller frame 1. The seat support rack 16 may also be covered with a fabric for using as a chair or bassinet.

The handle holder 2 is connected to one end of the stroller frame 1. In this embodiment the handle holder 2 is mounted on the upper end of the push arm 15 and equipped with a hand-detecting device 3 for creating a signal when user's hand being held or touched on the handle holder 2.

Referring to FIG. 3, the handle holder 2 may include a metal foil 22, and use a non-metal cover layer 21 covered on the metal foil 22. The hand-detecting device 3 may be embodied as a capacitive sensor electrically connected with the metal foil 22; when a user's hand being touched on the non-metal cover layer 21, the capacitive sensor shall detecting the cumulative change on the metal foil 22 and creating the signal send to the electric motor 5.

The electric motor 5 is capable of driving the brake mechanism 4 to brake the first wheel 18 when being received the signal from the hand-detecting device 3, and un-brake the first wheel 18 when the signal from the hand-detecting device 3 being disappeared.

The battery 6 electrically connected to the hand-detecting device 3 and the electric motor 5 for supplying needed power thereto.

Referring to FIGS. 4, 6 to 8, the first wheel 18 has a first retractably engaging element 180 capable of sliding along the first wheel axle 183 and synchronously rotated with the first wheel 18.

The brake mechanism 4 is operatively mounted on one side of a first wheel 18 of the stroller frame 1 for braking and un-braking the first wheel 18. The brake mechanism 4 of this embodiment includes a first wheel mount 41 and a first clutch mechanism 42. The first wheel mount 41 is connected to a lower end of the stroller frame 1, and has one side formed with a first engaging cavity 410 for engaging with the first retractably engaging element 180 to brake the first wheel 18. The first clutch mechanism 42 is driven by the electric motor 5 via a power transmitting gear 425 to rotate thereby to push away and disengage the first retractably engaging element 180 from the first engaging cavity 410 to un-brake the first wheel 18.

Figure 4:
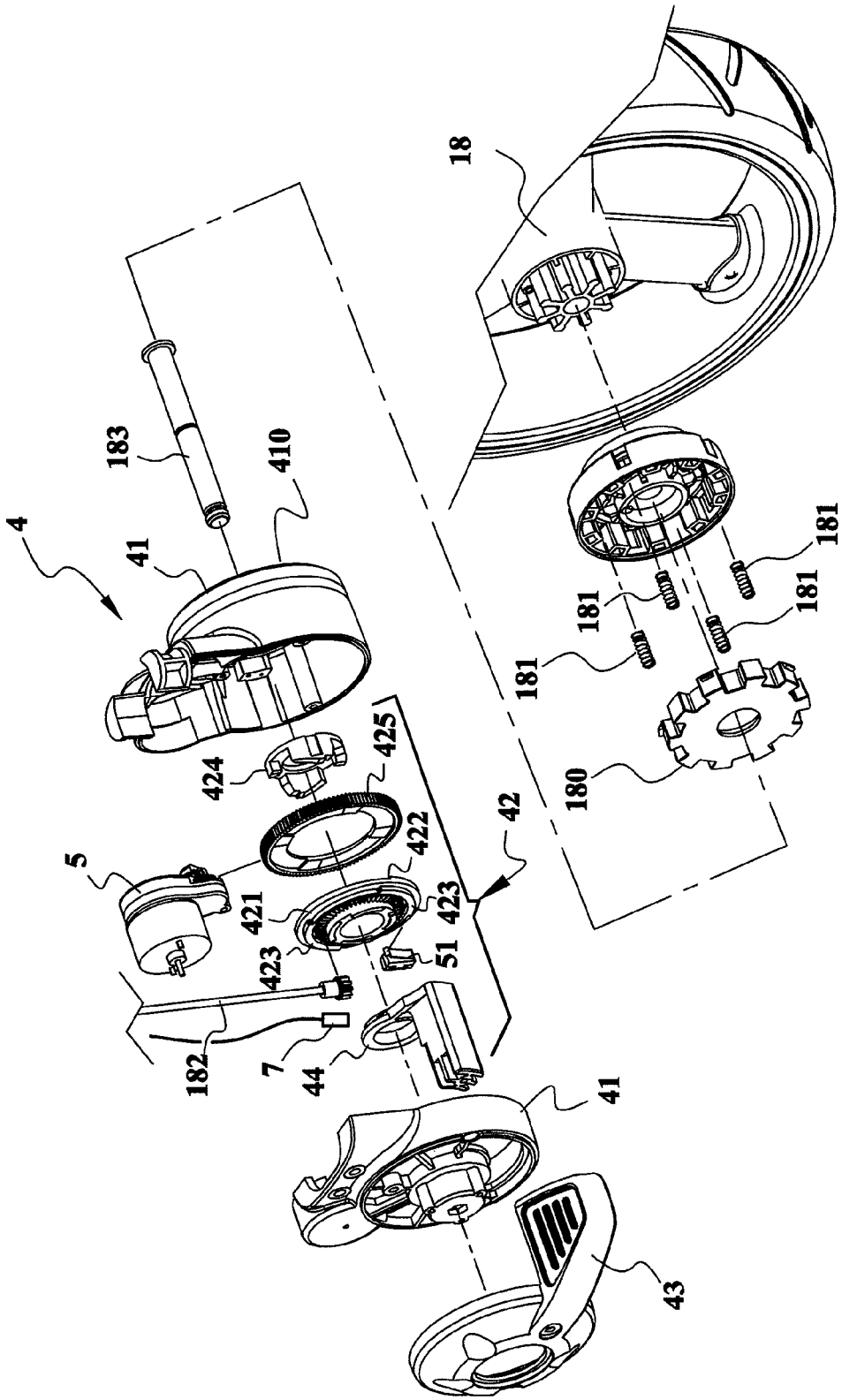
FIG. 4 is an exploded perspective view showing the connection of electric motor, a first brake mechanism and a first wheel according to the present invention.

Referring to FIG. 4, the first retractably engaging element 180 may have a teethed peripheral, and the first engaging cavity 410 may have an relative teethed inner surface for receiving and engaging with the teethed peripheral of the first retractably engaging element 180; preferably the first retractably engaging element 180 is biased by at least a spring 181 toward the first engaging cavity 410 thereby retaining the first retractably engaging element 180 in a normal braking position.

The first clutch mechanism 42 may include a first driving plate 421 and a pusher propeller 424. The first driving plate 421 is driven by the electric motor 5, and has one side formed with a plurality of sliding slant faces 422 spaced apart from each other at a predetermined angle, for example 90°.

The pusher propeller 424 has one side formed with a plurality of protruded portions spaced apart from each other at said predetermined angle for slidably abutting against the plurality of sliding slant faces 422.

When the first driving plate 421 is rotated by the electric motor 5 in the predetermined angle, the plurality of sliding slant faces 422 would push the pusher propeller 424 toward the first retractably engaging element 180 thereby to disengage the first retractably engaging element 180 from the first engaging cavity 410, so as to un-brake the first wheel 18; and when the first driving plate 421 is rotated a further predetermined angle by the electric motor 5, the plurality of sliding slant faces 422 would retract the pusher propeller 424 to allow the spring 181 biasing the first retractably engaging element 180 to engage with the first engaging cavity 410 again, so as to brake the first wheel 18.

The first clutch mechanism 42 may also include a driving pedal 43 movable in rotation for driving the first driving plate 421 to rotate through the predetermined angle by downward pedal stroke, so as to brake and un-brake the first wheel 18 manually by foot. When the electric motor out of order accidentally, the user may step down the driving pedal 43 to brake and un-brake the first wheel 18.

The first clutch mechanism 42 may include an one-way ratchet element 44 for associating the driving pedal 43 drive the first driving plate 421 to rotate in the predetermined angle, in every downward pedal stroke, by this way to push the pusher propeller 424 toward the first retractably engaging element 180 and disengage the first retractably engaging element 180 from the first engaging cavity 410, so as to un-brake the first wheel 18; when the first driving plate 421 is rotated a further predetermined angle by the driving pedal 43, the plurality of sliding slant faces 422 would retract the pusher propeller 424 to allow the spring 181 to bias the first retractably engaging element 180 toward and engage with the first engaging cavity 410 again, so as to brake the first wheel 18.

In this embody, the first driving plate 421 may be formed with a plurality of angularly spaced apart protruded portion 423 for switching a switch 51 thereby to turn-off the electric motor 5 when the first driving plate 421 being rotated through the predetermined angle.

Referring to FIGS. 3 and 4, the hand-detecting brake system for baby stroller according to the present may further includes a brake detecting device 7 and a display panel 8. The brake detecting device 7 may be mounted in the first wheel mount 41 for detecting a braking and un-braking status of the brake mechanism 4, and the display panel 8 electrically connected with the brake detecting device 7 and the electric motor 5 for monitoring and controlling the brake mechanism 4.

Figure 5:
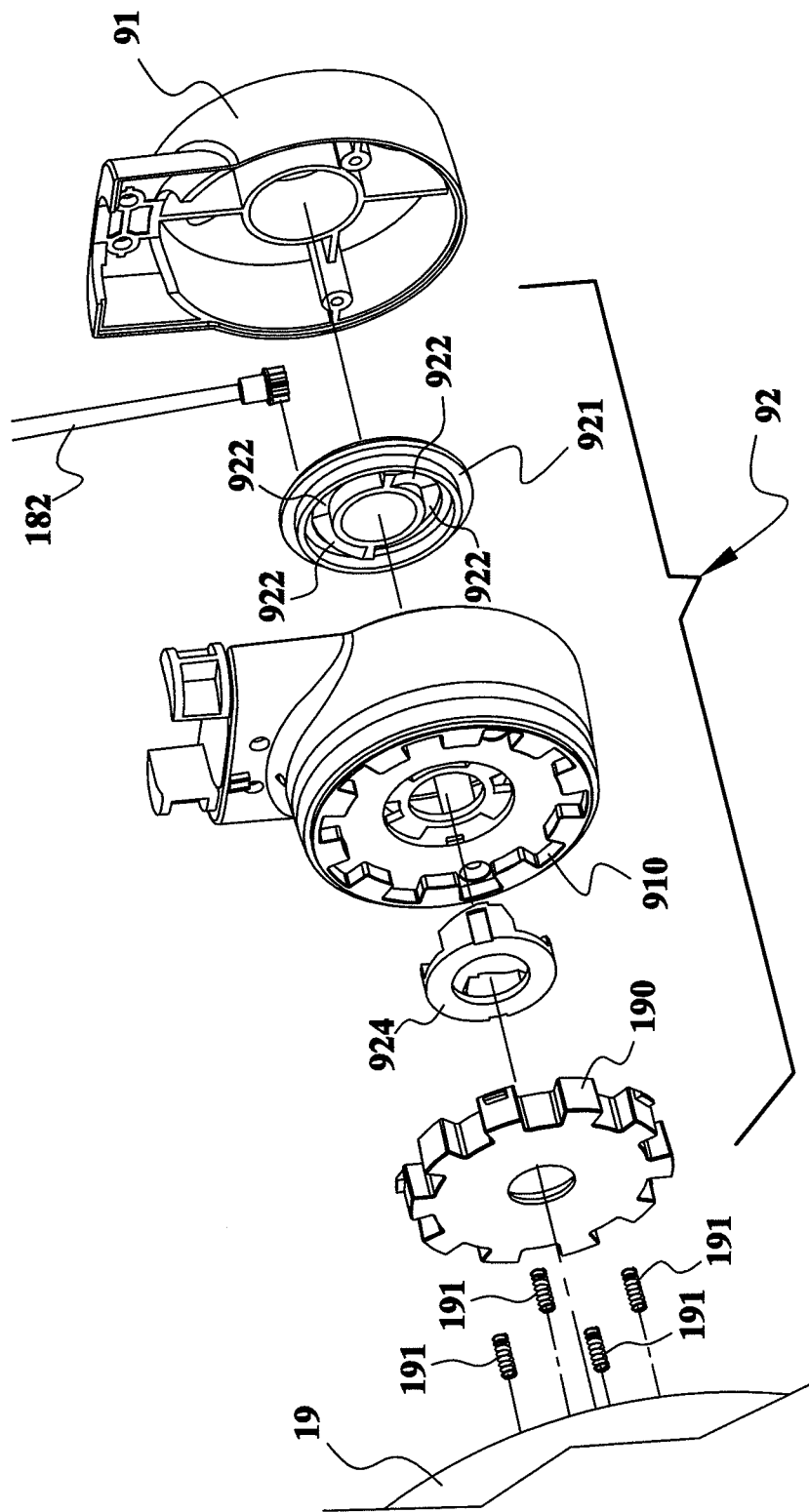
FIG. 5 is an exploded perspective view showing the connection of a second brake mechanism and a second wheel according to the present invention.
Figure 6:
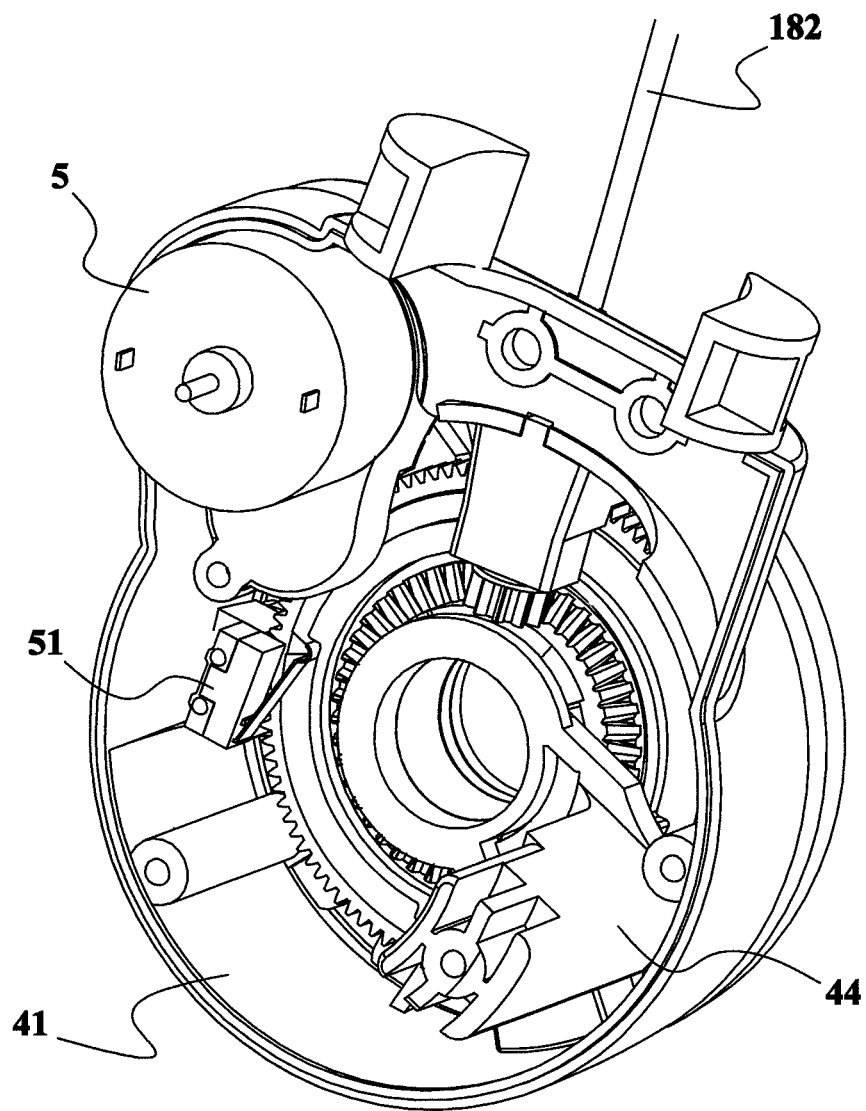
FIG. 6 is a schematic perspective view showing the first brake mechanism (the driving pedal is took off from the one-way ratchet element for viewing more clearer).
Figure 7:
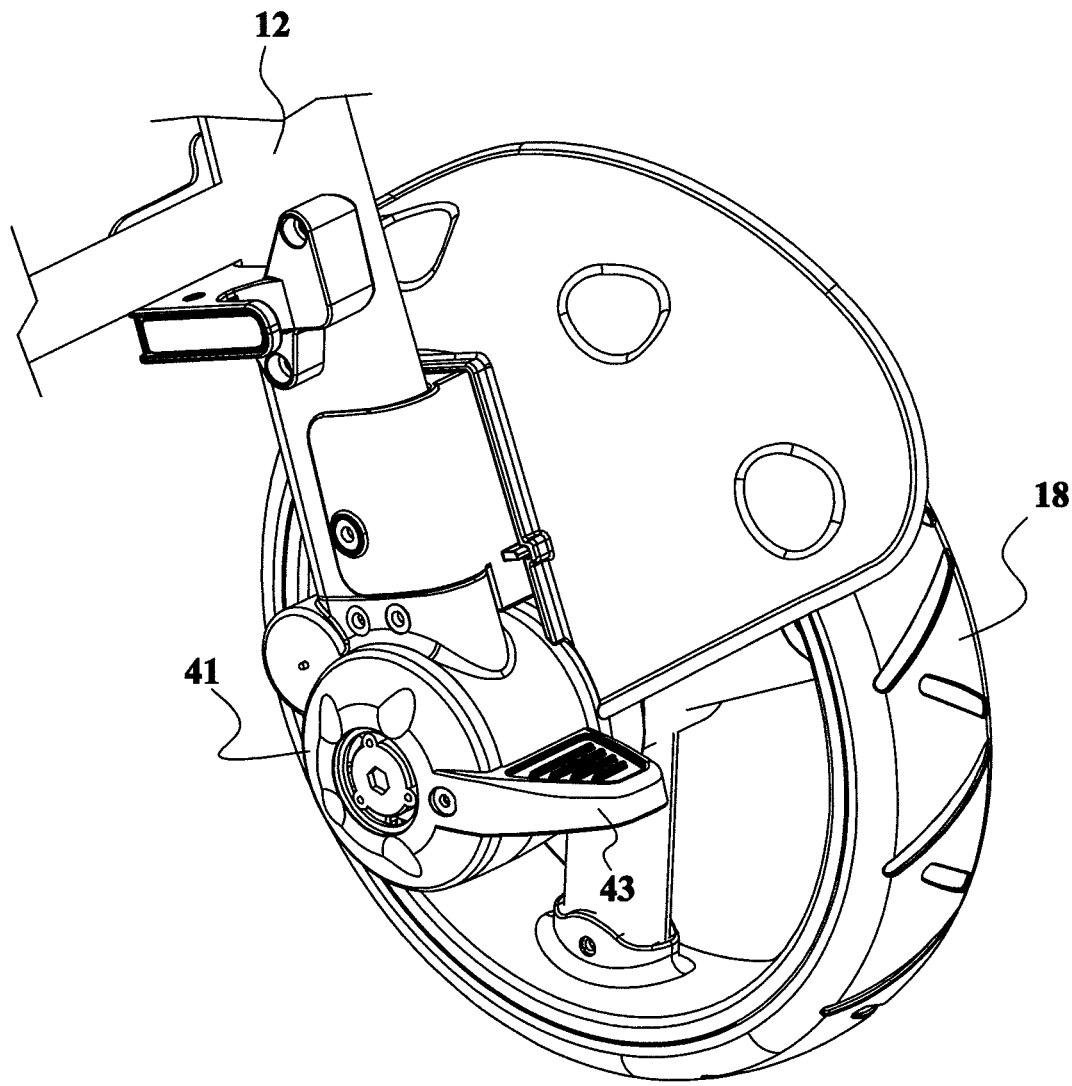
FIG. 7. is a schematic perspective view showing the first brake mechanism (the driving pedal is installed on the one-way ratchet element).
Figure 8:
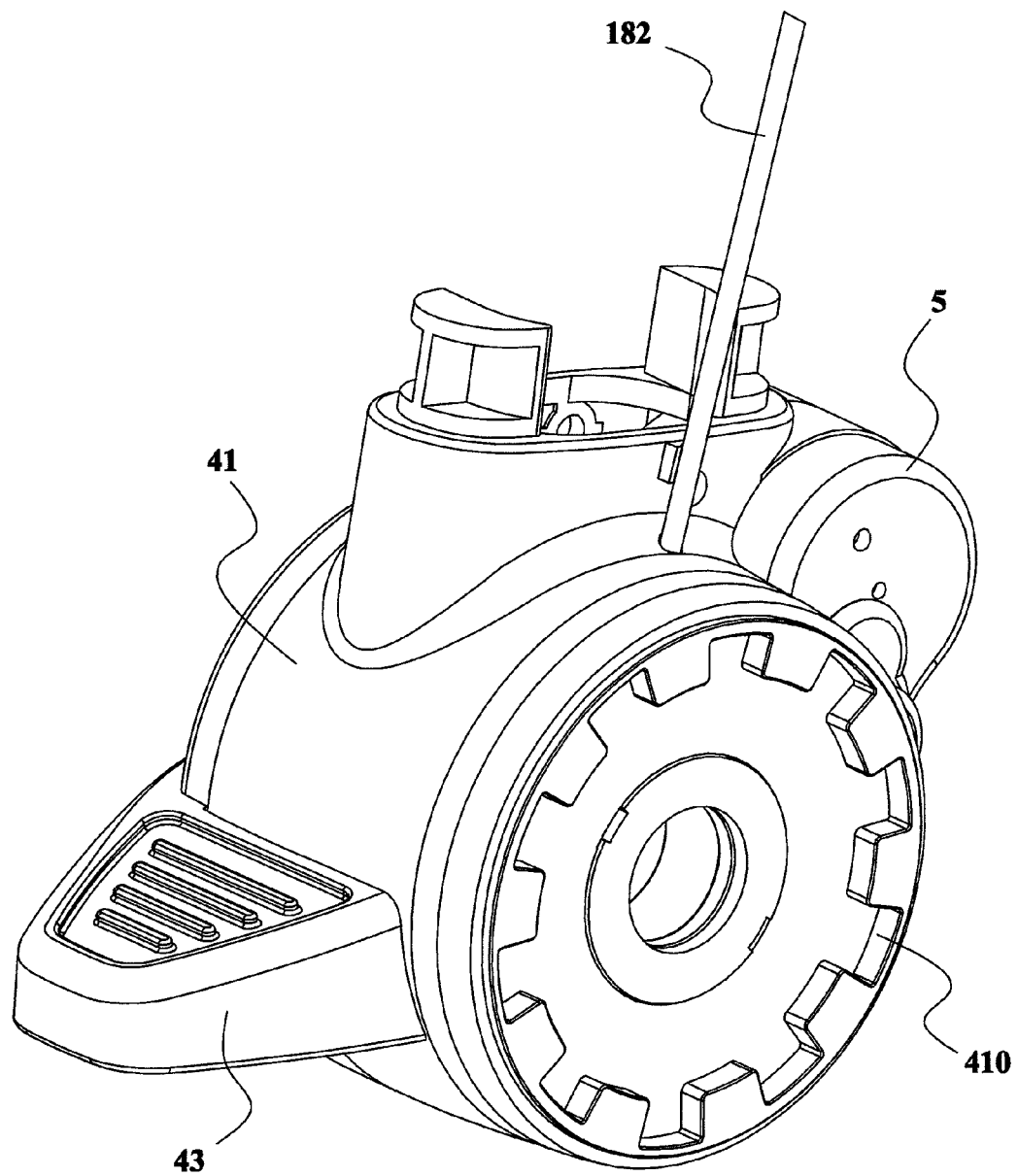
FIG. 8. is another view for showing the first brake mechanism.
Figure 9:
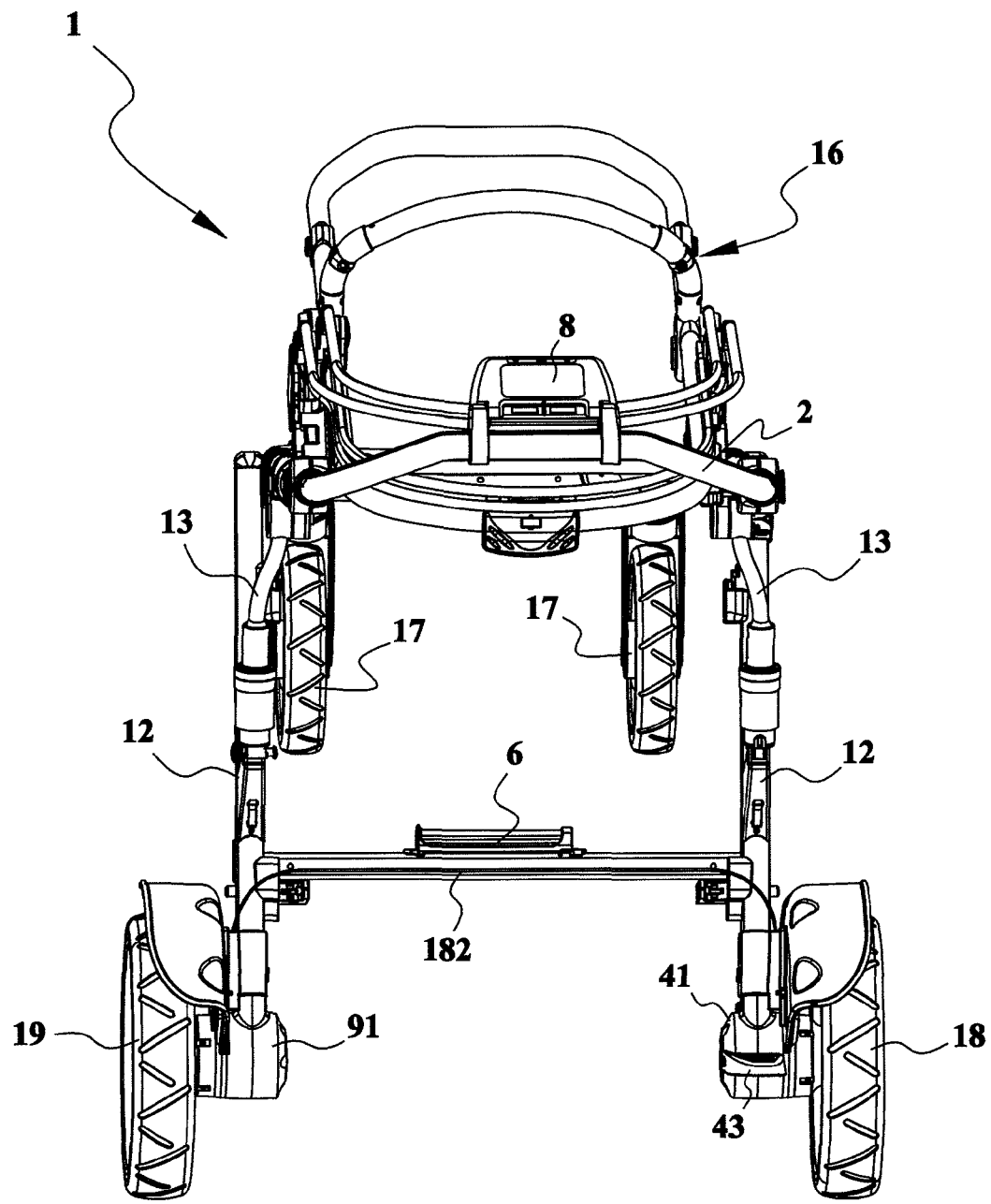
FIG. 9. is a rear view for clearly showing the first brake mechanism and the second brake mechanism is associated by a flexible power transmitting element.
Figure 10:
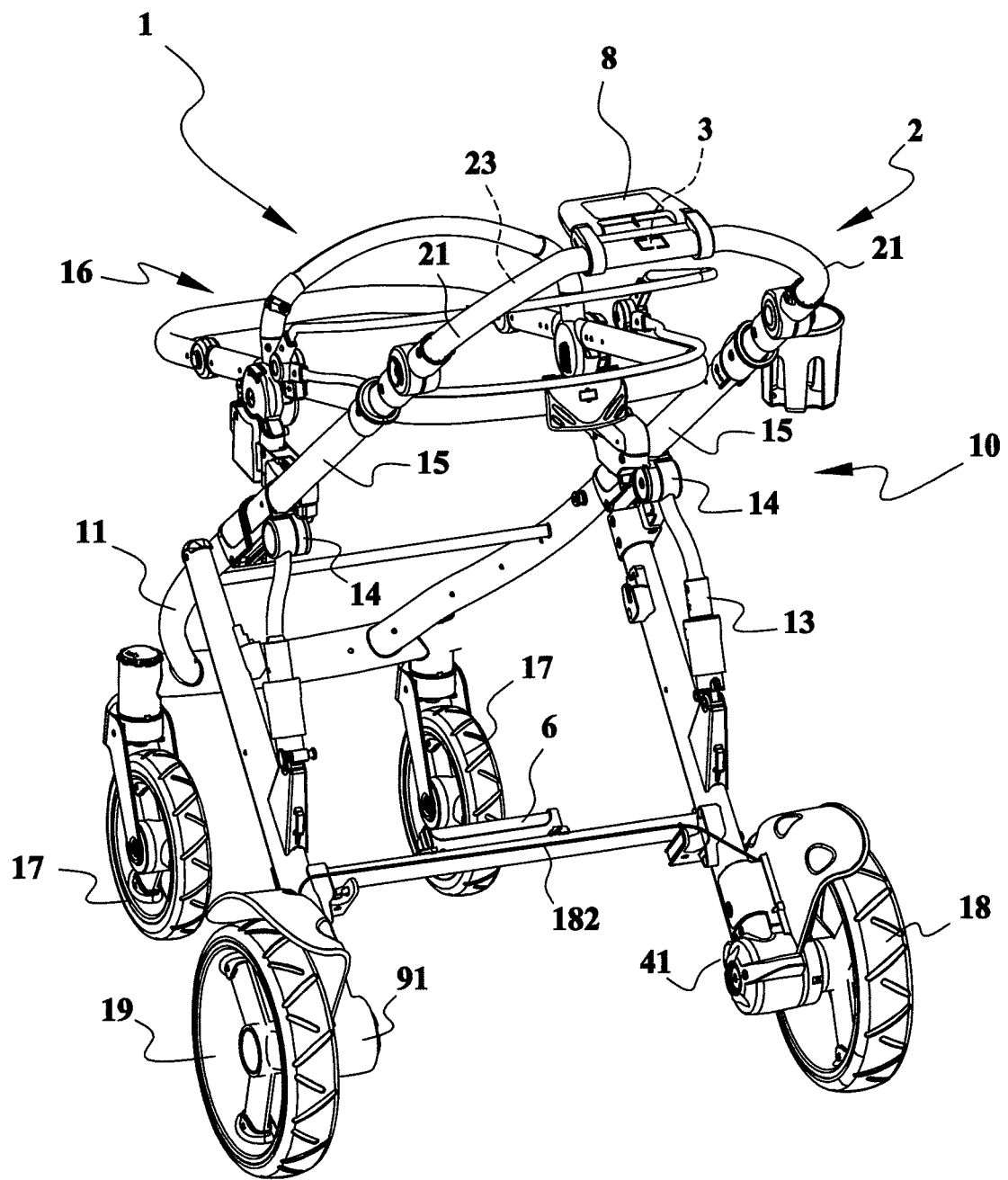
FIG. 10. is a rear-left perspective view for clearly showing the first brake mechanism and the second brake mechanism is associated by a flexible power transmitting element.

Referring to FIGS. 5, 9 and 10, the hand-detecting brake system for baby stroller according to the present may further includes a second wheel 19. The second wheel 19 may have a second retractably engaging element 190 capable of sliding along a wheel axle thereof and synchronously rotated with the second wheel 19; and the brake mechanism 4 may further include a second wheel mount 91 and a second clutch mechanism 92.

The second wheel mount 91 is connected to another lower end of the stroller frame 1, and formed with a second engaging cavity 910 for engaging with the second retractably engaging element 190 to brake the second wheel 19; the second clutch mechanism 92 is associated with the first clutch mechanism 42 for disengaging the second retractably engaging element 190 from the second engaging cavity 910, so as to brake and un-brake the first wheel 18 and the second wheel 19 synchronously.

Referring to FIG. 5, the second clutch mechanism 92 may include a second driving plate 921 and a pusher propeller 924;

the second driving plate 921 is driven by a flexible power transmitting element 182 for synchronously rotating with the first driving plate 421, and has one side formed with a plurality of sliding slant faces 922 spaced apart from each other at a predetermined angle; the pusher propeller 924 may have one side formed with a plurality of protruded portions spaced apart from each other at the predetermined angle for slidably abutting against the plurality of sliding slant faces 922.

When the second driving plate 921 is rotated in the predetermined angle, the plurality of sliding slant faces 922 would push the pusher propeller 924 toward the second retractably engaging element 190 thereby to disengage the second retractably engaging element 190 from the second engaging cavity 910, so as to un-brake the second wheel 19; and when the second driving plate 921 is rotated a further predetermined angle by synchronously rotated with the first driving plate 421, the plurality of sliding slant faces 922 would retract the pusher propeller 924 to allow the second retractably engaging element 190 to engage with the second engaging cavity 910 again, so as to brake the first wheel 18 and the second wheel 19 synchronously.

The second retractably engaging element 190 may be formed with a teethed peripheral, and the second engaging cavity 910 may be formed with a relative teethed inner surface for receiving and engaging with the teethed peripheral of the second retractably engaging element 190, and the second retractably engaging element 190 is biased by at least a spring 191 toward the second engaging cavity 910 thereby retaining the second retractably engaging element 190 in a normal braking position.

Figure 11:
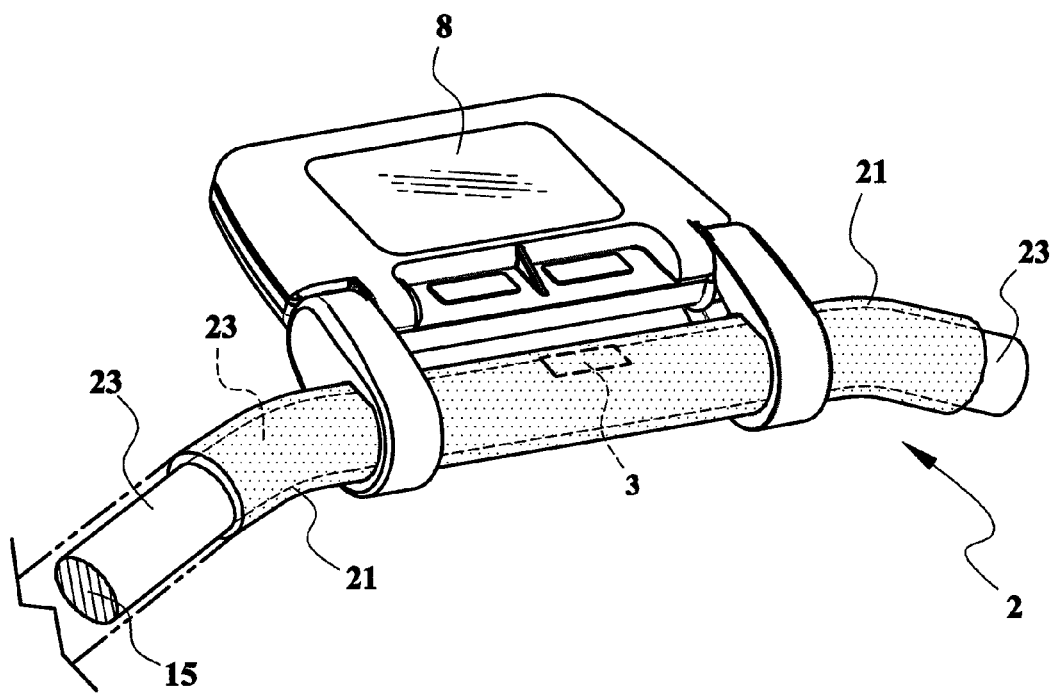
FIG. 11. is a side view for showing an alternative embodiment of the hand holder, which equipped with a control panel and a hand detecting device connected to a metal tube and both are covered with a layer of non-metal material.

Referring to FIGS. 10 and 11, an alternative embodiment of the handle holder 2 includes a non-metal cover layer 21 and a metal tube 23 (instead of the metal foil 22). The non-metal cover layer 21 may be made of foam rubber or plastic covered on the surface of the metal tube 23.

The hand-detecting device 3 may be embodied as a capacitive sensor electrically connected with the metal tube 23 for detecting a cumulative change for creating the signal, when a user's hand being touched or held on the non-metal cover layer 21, this would cause the electric motor 5 to drive the brake mechanism 4 to un-brake the first wheel 18 and the second wheel 19 automatically and synchronously, and when a user's hand is left the non-metal cover layer 21, hand-detecting device 3 (capacitive sensor) would send the signal again to the electric motor 5 to drive the brake mechanism 4 to brake the first wheel 18 and the second wheel 19 automatically and synchronously.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A hand-detecting brake system for baby stroller, equipped on a stroller frame (1), comprising:
  a handle holder (2) connected to one end of the stroller frame (1), having a hand-detecting device (3) for creating a signal when a user's hand touches the handle holder (2);
  a brake mechanism (4) operatively mounted on one side of a first wheel (18) of the stroller frame (1) for braking and un-braking the first wheel (18);
  an electric motor (5) capable of driving the brake mechanism (4) to brake the first wheel (18) when received the signal from the hand-detecting device (3), and un-brake the first wheel (18) when the signal from the hand-detecting device (3) being disappeared; and
  a battery (6) electrically connected to the hand-detecting device (3) and the electric motor (5) for supplying needed power thereto, wherein
  the first wheel (18) has a first retractably engaging element (180) capable of sliding along a first wheel axle (183) thereof and synchronously rotated with the first wheel (18); and the brake mechanism (4) includes:
  a first wheel mount (41) connected to a lower end of the stroller frame (1), formed with a first engaging cavity (410) for engaging with the first retractably engaging element (180) to brake the first wheel (18); and
  a first clutch mechanism (42) driven by the electric motor (5) for disengaging the first retractably engaging element (180) from the first engaging cavity (410) to un-brake the first wheel (18), and
  wherein the first retractably engaging element (180) has a teethed peripheral, and the first engaging cavity (410) has a relative teethed inner surface for receiving and engaging with the teethed peripheral of the first retractably engaging element (180), and wherein the first retractably engaging element (180) is biased by at least a spring (181) toward the first engaging cavity (410) thereby retaining the first retractably engaging element (180) in a normal braking position.

2. A hand-detecting brake system for baby stroller, equipped on a stroller frame (1), comprising:
  a handle holder (2) connected to one end of the stroller frame (1), having a hand-detecting device (3) for creating a signal when a user's hand touches the handle holder (2);
  a brake mechanism (4) operatively mounted on one side of a first wheel (18) of the stroller frame (1) for braking and un-braking the first wheel (18);
  an electric motor (5) capable of driving the brake mechanism (4) to brake the first wheel (18) when received the signal from the hand-detecting device (3), and un-brake the first wheel (18) when the signal from the hand-detecting device (3) being disappeared; and
  a battery (6) electrically connected to the hand-detecting device (3) and the electric motor (5) for supplying needed power thereto, wherein
  the first wheel (18) has a first retractably engaging element (180) capable of sliding along a first wheel axle (183) thereof and synchronously rotated with the first wheel (18); and the brake mechanism (4) includes:
  a first wheel mount (41) connected to a lower end of the stroller frame (1), formed with a first engaging cavity (410) for engaging with the first retractably engaging element (180) to brake the first wheel (18); and
  a first clutch mechanism (42) driven by the electric motor (5) for disengaging the first retractably engaging element (180) from the first engaging cavity (410) to un-brake the first wheel (18), and
  wherein the first clutch mechanism (42) includes:
  a first driving plate (421) driven by the electric motor (5), having one side formed with a plurality of sliding slant faces (422) spaced apart from each other at a predetermined angle; and
  a pusher propeller (424) having one side formed with a plurality of protruded portions spaced apart from each other at the predetermined angle for slidably abutting against the plurality of sliding slant faces (422); when the first driving plate (421) is rotated by the electric motor (5) in the predetermined angle, the plurality of sliding slant faces (422) would push the pusher propeller (424) toward the first retractably engaging element (180) thereby to disengage the first retractably engaging element (180) from the first engaging cavity (410), so as to un-brake the first wheel (18); and when the first driving plate (421) is rotated a further predetermined angle by the electric motor (5), the plurality of sliding slant faces (422) would retract the pusher propeller (424) to allow the spring (182) biasing the first retractably engaging element (180) to engage with the first engaging cavity (410) again, so as to brake the first wheel (18).

3. The hand-detecting brake system for baby stroller of claim 2, wherein the first clutch mechanism (42) includes a driving pedal (43) movable in rotation for driving the first driving plate (421) to rotate through the predetermined angle by every pedal stroke, so as to brake and un-brake the first wheel (18) manually by foot.

4. The hand-detecting brake system for baby stroller of claim 3, wherein the first clutch mechanism (42) includes an one-way ratchet element (44), and the driving pedal (43) is capable of driving the first driving plate (421) to rotate in the predetermined angle by the one-way ratchet element (44) in every downward pedal stroke, so as to push the pusher propeller (424) toward the first retractably engaging element (180) thereby to disengage the first retractably engaging element (180) from the first engaging cavity (410), so as to un-brake the first wheel (18); and when the first driving plate (421) is rotated a further predetermined angle by the driving pedal (43), the plurality of sliding slant faces (422) would retract the pusher propeller (424) to allow the spring (182) biasing the first retractably engaging element (180) to engage with the first engaging cavity (410) again, so as to brake the first wheel (18).

5. The hand-detecting brake system for baby stroller of claim 2, wherein the first driving plate (421) has a plurality of angularly spaced apart protruded portions (423) for switching a switch (51) thereby to turn-off the electric motor (5) when the first driving plate (421) is rotated at the predetermined angle.

6. A hand-detecting brake system for baby stroller, equipped on a stroller frame (1), comprising:
a handle holder (2) connected to one end of the stroller frame (1), having a hand-detecting device (3) for creating a signal when a user's hand touches the handle holder (2);
a brake mechanism (4) operatively mounted on one side of a first wheel (18) of the stroller frame (1) for braking and un-braking the first wheel (18);
an electric motor (5) capable of driving the brake mechanism (4) to brake the first wheel (18) when received the signal from the hand-detecting device (3), and un-brake the first wheel (18) when the signal from the hand-detecting device (3) being disappeared;
a battery (6) electrically connected to the hand-detecting device (3) and the electric motor (5) for supplying needed power thereto; and
a second wheel (19) having a second retractably engaging element (190) capable of sliding along a wheel axle thereof and synchronously rotated with the second wheel (19),
wherein said brake mechanism (4) includes:
a second wheel mount (91) connected to another lower end of the stroller frame (1), formed with a second engaging in cavity (910) for engaging with the second retractably engaging element (190) to brake the second wheel (19); and
a second clutch mechanism (92) associated with the first clutch mechanism (42) for disengaging the second retractably engaging element 190) from the second engaging cavity (910), so as to brake and un-brake the first wheel (18) and the second wheel (19) synchronously, and
wherein the second clutch mechanism (92) includes:
a second driving plate (921) driven by a flexible power transmitting element (182) for synchronously rotating with a first driving plate (421), having one side formed with a plurality of sliding slant faces (922) spaced apart from each other at a predetermined angle; and
a pusher propeller (924) having one side formed with a plurality of protruded portions spaced apart from each other at the predetermined angle for slidably abutting against the plurality of sliding slant faces (922); when the second driving plate (921) is rotated in the predetermined angle, the plurality of sliding slant faces (922) would push the pusher propeller (924) toward the second retractably engaging element (190) thereby to disengage the second retractably engaging element (190) from the second engaging cavity (910), so as to un-brake the second wheel (19); and when the second driving plate (921) is rotated a further predetermined angle by synchronously rotated with the first driving plate (421), the plurality of sliding slant faces (922) would retract the pusher propeller (924) to allow the second retractably engaging element (190) to engage with the second engaging cavity (910) again, so as to brake the first wheel (18) and the second wheel (19) synchronously.

7. A hand-detecting brake system for baby stroller, equipped on a stroller frame (1), comprising:
a handle holder (2) connected to one end of the stroller frame (1), having a hand-detecting device (3) for creating a signal when a user's hand touches the handle holder (2);
a brake mechanism (4) operatively mounted on one side of a first wheel (18) of the stroller frame (1) for braking and un-braking the first wheel (18);
an electric motor (5) capable of driving the brake mechanism (4) to brake the first wheel (18) when received the signal from the hand-detecting device (3), and un-brake the first wheel (18) when the signal from the hand-detecting device (3) being disappeared;
a battery (6) electrically connected to the hand-detecting device (3) and the electric motor (5) for supplying needed power thereto; and
a second wheel (19) having a second retractably engaging element (190) capable of sliding along a wheel axle thereof and synchronously rotated with the second wheel (19),
wherein said brake mechanism (4) includes:
a second wheel mount (91) connected to another lower end of the stroller frame (1), formed with a second engaging cavity (910) for engaging with the second retractably engaging element (190) to brake the second wheel (19); and
a second clutch mechanism (92) associated with the first clutch mechanism (42) for disengaging the second retractably engaging element 190) from the second engaging cavity (910), so as to brake and un-brake the first wheel (18) and the second wheel (19) synchronously, and
wherein the second retractably engaging element (190) has a teethed peripheral, and the second engaging cavity (910) has a relative teethed inner surface for receiving and engaging with the teethed peripheral of the second retractably engaging element (190), and wherein the second retractably engaging element (190) is biased by at least a spring (191) toward the second engaging cavity (910) thereby retaining the second retractably engaging element (190) in a normal braking position.

\* \* \* \* \*